Feb. 18, 1930.  A. R. PRIBIL  1,747,319
WHEEL YOKE
Filed Nov. 27, 1925
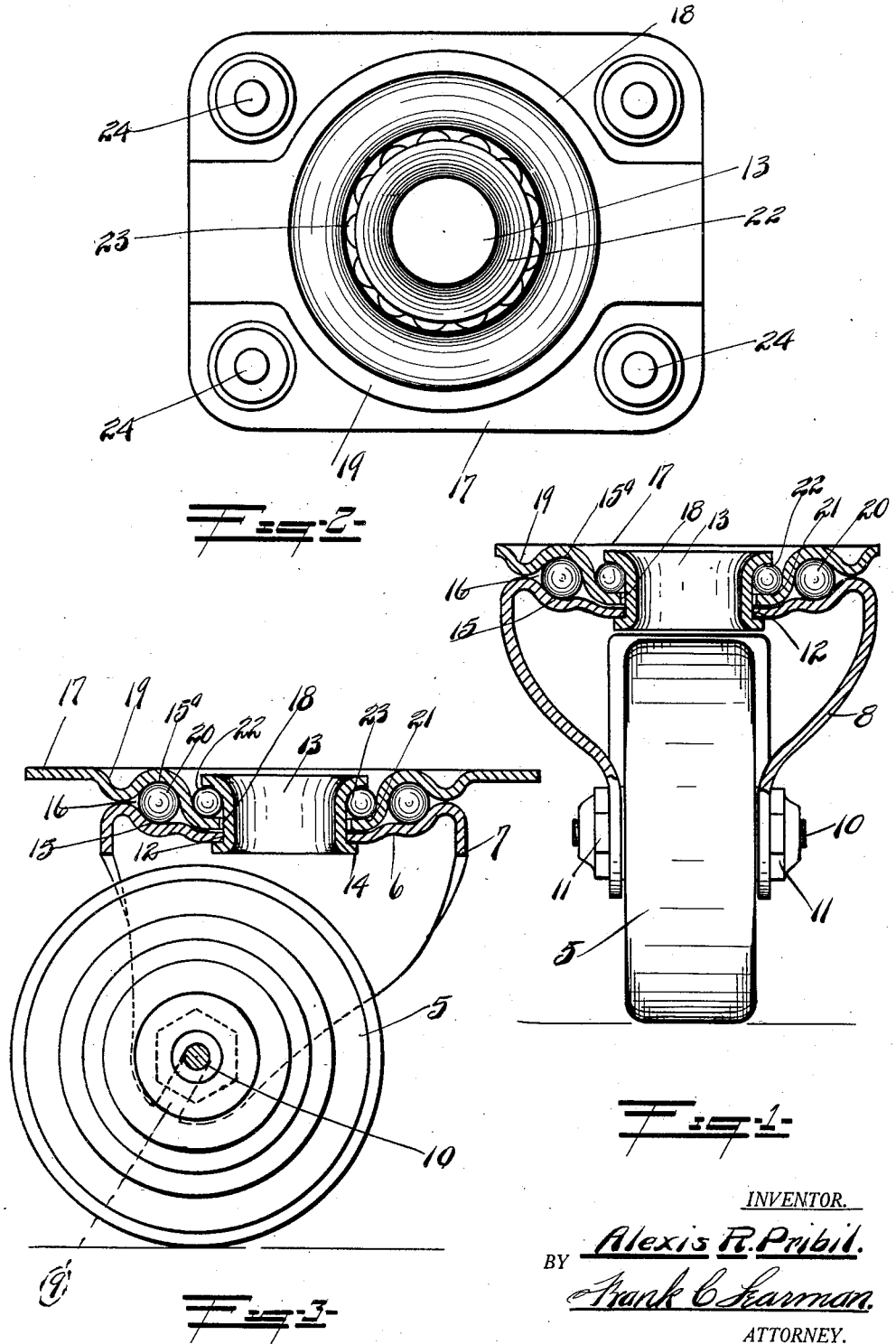
INVENTOR.
Alexis R. Pribil.
BY Frank C. Scarman.
ATTORNEY.

Patented Feb. 18, 1930

1,747,319

UNITED STATES PATENT OFFICE

ALEXIS R. PRIBIL, OF SAGINAW, MICHIGAN

WHEEL YOKE

Application filed November 27, 1925. Serial No. 71,818.

This invention relates to wheel yokes and particularly to a swiveling yoke for use on articles of furniture, small trucks and vehicles.

One object of the invention is to design a yoke of exceeding simple construction which can be formed entirely of stampings, making it very economical to manufacture.

Another object is to design a yoke having anti-friction elements between the stationary and swiveling members, insuring ease of operation, long life to the various parts, and a minimum of wear on the floor traversed.

A further object is to provide a stamped yoke which can be readily assembled, and which are not apt to get out of order.

The above and other objects will appear as the specification progresses, reference being had to the accompanying drawing in which I have shown the preferred embodiment of my invention, and in which like reference numerals indicate like parts throughout the several views thereof.

In the drawing,

Fig. 1 is a vertical sectionable edge view of my improved yoke showing it mounted on a roller.

Fig. 2 is a top plan view.

Fig. 3 is a vertical sectional side view.

Referring now particularly to the drawing in which I have shown the preferred embodiment of my invention, the numeral 5 indicates a wheel which can be of any suitable construction, and which is journaled in a wheel yoke 6 formed with spaced apart wings 7 and 8 respectively, the lower end of each wing being slotted as shown at 9 to receive the axle 10 of the wheel, the ends of the axle being threaded and nuts 11 are threaded thereon in the usual manner.

The wings 7 and 8 are preferably slightly bell shaped and taper towards their lower ends, projecting rearwardly of the central axis of the yoke body. A centrally disposed opening 12 is provided in the upper surface of the yoke and a cylindrical stamped hub member 13 extends therethrough, the end being turned or flanged as shown at 14.

The upper face of the yoke 6 is slightly dished or grooved as shown at 15 and forms the lower half of a raceway 16, the inner edge being slightly bent downwardly and rests on the turned edge 14 of the cylindrical hub.

A rectangular cover or top plate 17 is mounted on the yoke 6 and is formed with a centrally disposed opening 18 which is adjusted to fit over the hub member 13, the upper surface being grooved as shown at 15$^a$ forming the upper half of the raceway 16, and in which anti-friction balls 20 are mounted, the inner edge of the plate being bent down and rounded, to form a second ball groove 21, the upper edge of the cylindrical hub being turned as shown at 22 and forms the upper half of the ball race in which a plurality of anti-friction balls 23 are mounted.

Spaced apart openings 24 are provided in the top plate 17 to facilitate securing the yoke to a truck or article of furniture, and while in the present instance I have shown a flat upper plate, it will be understood that it may be cupped or formed to any desired shape to fit the object to which it is to be attached without departing from the spirit of the invention.

The stampings are of course heat treated and hardened insuring long wear and service, and the arrangement of the balls insures the maximum of swiveling efficiency.

From the foregoing description it will be obvious that I have perfected a very simple, economical and efficient stamped yoke for wheels and casters of various kinds.

What I claim is:—

1. A stamped yoke comprising a frame having a centrally disposed opening and spaced apart wings, a cylindrical stamped hub having flanged ends, a top plate mounted on the yoke and embracing the hub, a ball groove formed in the yoke and plate respectively, and a second ball groove formed by the plate and the turned upper end of the hub.

2. A stamped wheel yoke formed with flaring downwardly projecting wings, a centrally disposed opening in the yoke, a ball groove in the face of the yoke, a cylindrical hub projecting through said opening and having its ends flared to engage the edge of said yoke opening, a cover plate mounted on the yoke and fitted over said hub, said plate being shaped to form a ball groove concentric with the groove in the yoke, the inner edge of the plate being shaped to form a ball groove between the plate and the upper turned end of the hub, and anti-friction balls mounted in said grooves.

In testimony whereof I hereunto affix my signature.

ALEXIS R. PRIBIL.